US007404062B2

United States Patent
Fleming et al.

(10) Patent No.: US 7,404,062 B2
(45) Date of Patent: *Jul. 22, 2008

(54) SYSTEM AND METHOD OF ALLOCATING CONTIGUOUS MEMORY IN A DATA PROCESSING SYSTEM

(75) Inventors: Matthew David Fleming, Austin, TX (US); Thomas Stanley Mathews, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/953,194

(22) Filed: Dec. 10, 2007

(65) Prior Publication Data

US 2008/0091912 A1    Apr. 17, 2008

Related U.S. Application Data

(63) Continuation of application No. 11/106,986, filed on Apr. 15, 2005, now Pat. No. 7,363,456.

(51) Int. Cl.
*G06F 12/00*    (2006.01)

(52) U.S. Cl. ..................................... 711/170
(58) Field of Classification Search .................. 711/170
See application file for complete search history.

(56) References Cited

U.S. PATENT DOCUMENTS

| 5,742,793 | A  |   | 4/1998  | Sturges et al. |
| 5,790,130 | A  |   | 8/1998  | Gannett |
| 5,819,061 | A  |   | 10/1998 | Glassen et al. |
| 5,867,649 | A  |   | 2/1999  | Larson |
| 6,286,088 | B1 |   | 9/2001  | Campbell et al. |
| 6,658,522 | B1 | * | 12/2003 | Martin et al. ................ 711/1 |
| 6,701,420 | B1 |   | 3/2004  | Hamilton et al. |
| 2002/0099918 | A1 |   | 7/2002 | Avner et al. |
| 2004/0168035 | A1 | * | 8/2004 | Romanufa et al. .......... 711/165 |
| 2005/0108496 | A1 |   | 5/2005 | Elnozahy et al. |
| 2005/0232192 | A1 |   | 10/2005 | Rawson |
| 2005/0235123 | A1 |   | 10/2005 | Zimmer et al. |

OTHER PUBLICATIONS

David Hepkin, Pretranslating Input/Output Buffers in Environments with Multiple Page Sizes, U.S. Appl. No. 10/920,907, filed Aug. 18, 2004.

(Continued)

*Primary Examiner*—Matt Kim
*Assistant Examiner*—John P Fishburn
(74) *Attorney, Agent, or Firm*—Matthew W. Baca; Dillon & Yudell LLP

(57)    ABSTRACT

A system and method of allocating contiguous real memory in a data processing system. A memory controller within system memory receives a request from a data processing system component for a contiguous block of memory during operation of the data processing system. In response to receiving the request, the memory controller selects a candidate contiguous block of memory. Then, after temporarily restricting access to the candidate contiguous block of memory, the memory controller identifies a set of frames currently in use within the candidate contiguous block of memory, relocates the set of frames, and allocates the candidate block of memory for exclusive use by the requesting data processing component. The allocation of contiguous real memory occurs dynamically during the operation of the data processing system.

3 Claims, 3 Drawing Sheets

OTHER PUBLICATIONS

Kriz, Ta, Variable Block Pging for Virtual Memory, TDB 09-84, pp. 2296-2298, Poughkeepsie.

Miller, T., Memory Proportioned Pages, TDB 07-73, p. 562-563, Rochester.

NN7106144 "Segment Swapping for Virtual Memory", IBM Technical Disclosure Bulletin, Jun. 1971.

NB84092296 "Variable Block Paging for Virtual Memory", IBM Technical Disclosure Bulletin, Sep. 1984.

* cited by examiner

SYSTEM AND METHOD OF ALLOCATING CONTIGUOUS MEMORY IN A DATA PROCESSING SYSTEM

PRIORITY CLAIM

The present application is a continuation of U.S. patent application Ser. No. 11/106,986, filed on Apr. 15, 2005, and entitled, "System and Method of Allocating Contiguous Memory in a Data Processing System," which is incorporated herein by reference.

BACKGROUND OF THE INVENTION

1. Technical Field

The present invention relates in general to the field of data processing systems. More particularly, the present invention relates to memory management within data processing systems. Still more particularly, the present invention relates to a system and method of allocating memory in data processing systems.

2. Description of the Related Art

Virtually all modern data processing systems utilize a virtual memory system to address memory space that greatly exceeds the size of actual, physical system memory. This virtual memory system frequently includes several levels of memory media, with smaller capacity, faster access memory units (e.g., caches, random-access memory) for storing recently-accessed data and larger capacity, slower access memory units (e.g., hard disk drives or other high-capacity storage units) that are only accessed when requested data is not found in the smaller-capacity memory units. Also, the virtual memory system typically includes a central memory controller for coordinating the transfer of data and instructions between the several levels of memory media. In this manner, the virtual memory system simulates a single, very large-capacity memory unit within the data processing system.

Processors access system memory via effective addresses that are later translated into physical addresses that reveal the actual, physical location of requested data or instructions. Because of the different levels of memory media, data or instructions located at contiguous effective addresses may not necessarily be located at contiguous physical addresses. For example, a first element of data may be located in the processor cache hierarchy because the first element was recently accessed by the processor. The second element of data may be located on the hard disk drive. Therefore, if the processor requires both elements for processing of a current task, the processor must wait for the central memory controller to retrieve the second element from the hard disk drive before processing of the current task can continue.

However, some data processing system components require the utilization of contiguous physical (also known as "real") memory regions. Components that require contiguous physical memory regions for operation are typically performance-oriented. The performance of such components would be compromised if the component would be required to halt operation during retrieval of necessary data from various levels of the virtual memory systems hierarchy. An example of such performance-oriented components are high-speed communication interconnect switches, which maintain control data in contiguous real memory regions.

Other reasons for maintaining contiguous real memory regions include system components that share large regions of memory for communication. For example, an operating system may share memory regions with system firmware. System firmware, unlike the operating system, cannot access memory via the virtual memory system.

A method well-known in the art for maintaining contiguous real memory regions involves reserving a static contiguous real memory region at system start up. However, there are many significant drawbacks to this prior art solution. First, the contiguous memory region must be statically sized at some default value or set by a system administrator based upon projected contiguous real memory usage requirements. The default value may not be appropriate for a particular system environment, which requires the system administrator to manually set a new value for the contiguous real memory region size. Also, since contiguous real memory region requirements vary over time, system administrators tend to conservatively oversize the allocated contiguous real memory region, which results in wasted system memory resources.

Another disadvantage to the prior art method is that since the contiguous real memory region is statically reserved from system memory, it is not available for general memory utilization. For example, if the current task consumes all available system memory earmarked for general utilization, any addition memory requirements cannot be satisfied from the contiguous real memory region, even if free memory is available within the contiguous real memory region.

Still another disadvantage to the prior art method is that any change in the size of the contiguous real memory region requires a system reboot. This results in interruption of the services provided by the data processing system.

Accordingly, there is a need for a system and method of dynamically allocating contiguous real memory regions.

SUMMARY OF THE INVENTION

The present invention includes a method of dynamic allocation of contiguous real memory regions from general system memory without relying upon a separate, statically-reserved contiguous memory pool. Also, the present invention includes a system for allocating and freeing regions within system memory. A region allocation request is generally handled by dynamically removing contiguous real memory from the system memory pool of the running system to satisfy the request. This dynamic removal is accomplished through use of a memory manager, including a Dynamic Reconfiguration (DR) framework, which identifies, isolates, and frees the desired memory. Additionally, the memory manager (through the DR framework) can notify components of the system, including applications, of the reduction in available system memory to allow them to adjust to the reduction. A region deallocation request is generally handled by dynamically adding the previously-allocated contiguous real memory of the region back into the system memory pool of the running system. This deallocation is accomplished through the memory manager (through the DR framework), which makes the memory available for other uses, including the possible use for backing memory for virtual memory pages or serving as the memory used in satisfying a future contiguous real memory region allocation. The memory manager may also notify system components of the addition of the memory to allow them to adjust.

Utilizing this method, the maximum contiguous real memory region that can be allocated is a logical memory block (LMB). The LMB size is dependent on the hardware, firmware, and administrative settings and can be of much more significant sizes than the virtual memory page sizes. LMBs are the unit of the DR. For region allocation request smaller than LMB size, these requests are satisfied through allocation heaps maintained over LMBs. The LMBs containing allocation heaps are dynamically allocated using the memory manager (through the DR framework) when a request is made for a small region and no allocation heap in a previously allocated LMB has sufficient contiguous free space available. A LMB containing an allocation heap is dynamically freed and returned back to the system memory pool utilizing the DR when all allocation heap space for that LMB is freed.

The above-mentioned features, as well as additional objectives, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
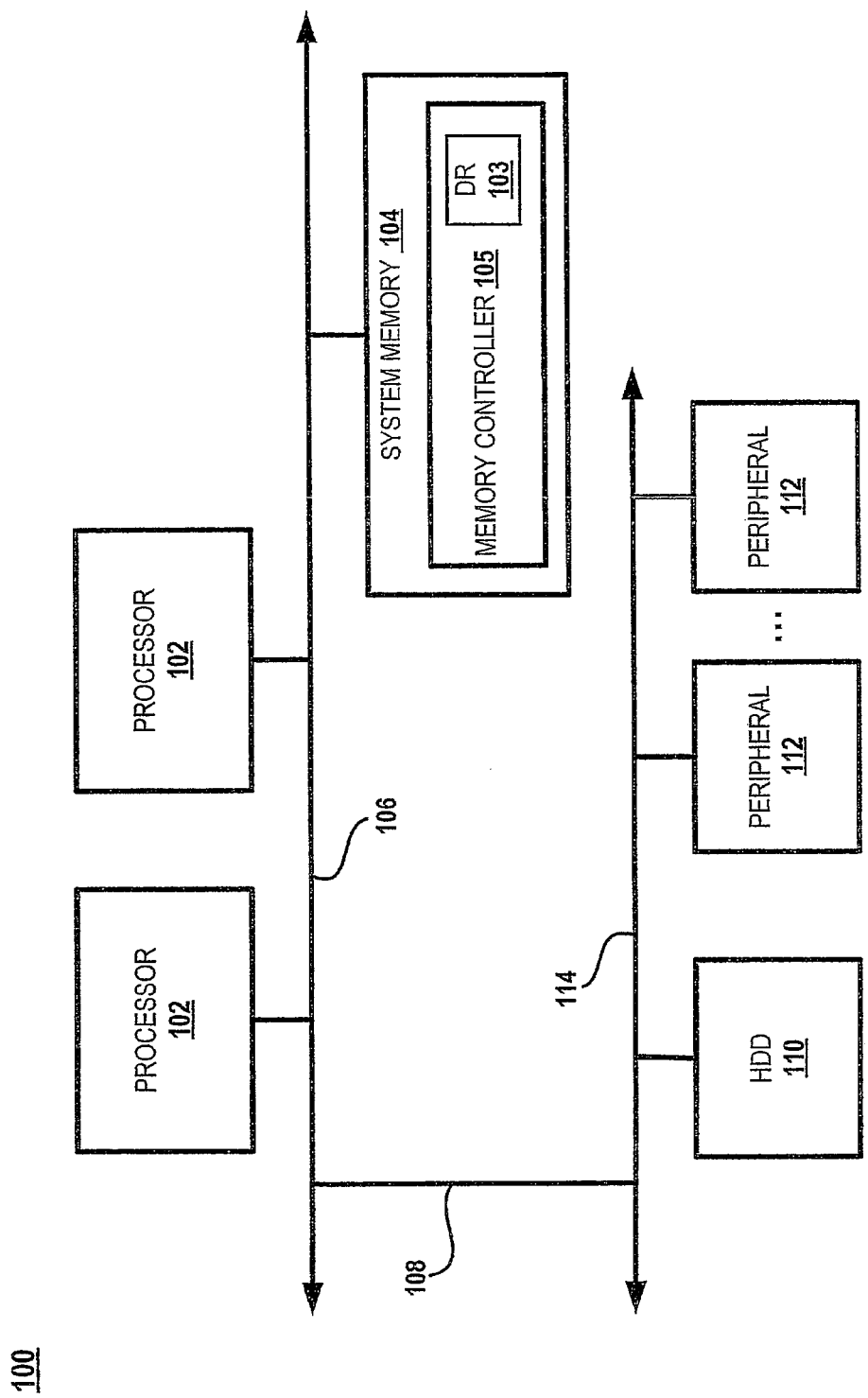
FIG. 1 is a block diagram of an exemplary data processing system in which a preferred embodiment of the present invention may be implemented.

With reference now to the figures and in particular, with reference to FIG. 1, there is depicted a block diagram of an exemplary data processing system 100 in which a preferred embodiment of the present invention may be implemented.

As depicted, exemplary data processing system 100 includes processor(s) 102, which are coupled to system memory 104 via system bus 106. Preferably, system memory 104 may be implemented as a collection of dynamic random access memory (DRAM) modules that store data and instructions. System memory 104 also includes a memory controller 105 for controlling access to and from system memory 104. Memory controller 105 further includes a dynamic reconfiguration (DR) framework 103 for identifying, isolating, and freeing desired memory within system memory 104. Mezzanine bus 108 acts as an intermediary between system bus 106 and peripheral bus 114. Those with skill in this art will appreciate that peripheral bus 114 may be implemented as a peripheral component interconnect (PCI), accelerated graphics port (AGP), or any other peripheral bus. Coupled to peripheral bus 114 is hard disk drive 110, which is utilized by data processing system 100 as a mass storage device. Also coupled to peripheral bus 114 are a collection of peripherals 112.

Those skilled in the art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system 100 to improve memory allocation provided by the present invention are applicable to data processing systems of any system architecture and are in no way limited to the generalized multiprocessor architecture or symmetric multi-processing (SMP) architecture illustrated in FIG. 1.

Figure 2A:
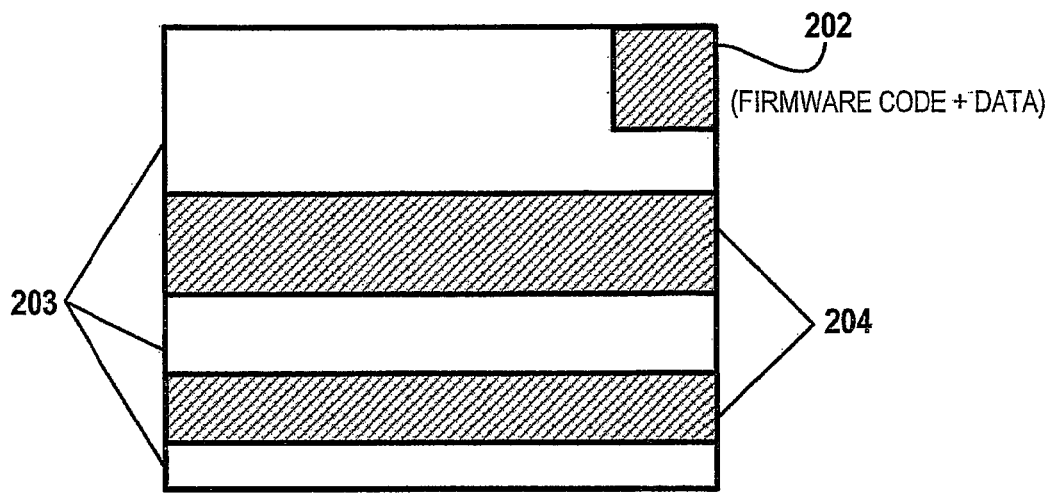
FIG. 2A is a block diagram depicting the physical contents of a system memory of the exemplary data processing system of FIG. 1.

With reference now to FIG. 2A, there is depicted a block diagram representing the physical contents of system memory 104 according to a preferred embodiment of the present invention. As depicted, system memory 104 includes firmware code and data 202. Those with skill in this art will appreciate that firmware code and data 202 may be copied from a read-only memory (ROM) module and stored in system memory 104 or that system memory 104 may also include a ROM module that includes firmware code and data 202. Also, firmware code and data 202 may include a hypervisor, which is a program that operates as a foundation to the operating system. The hypervisor's functions may include managing memory paging, the operating of multiple processors, and connections between memory partitions. Occupied regions 204 may contain instructions, data, and logical memory blocks for operating system, application, device driver, and other use. Unoccupied regions 203 are unoccupied memory regions.

Figure 2B:
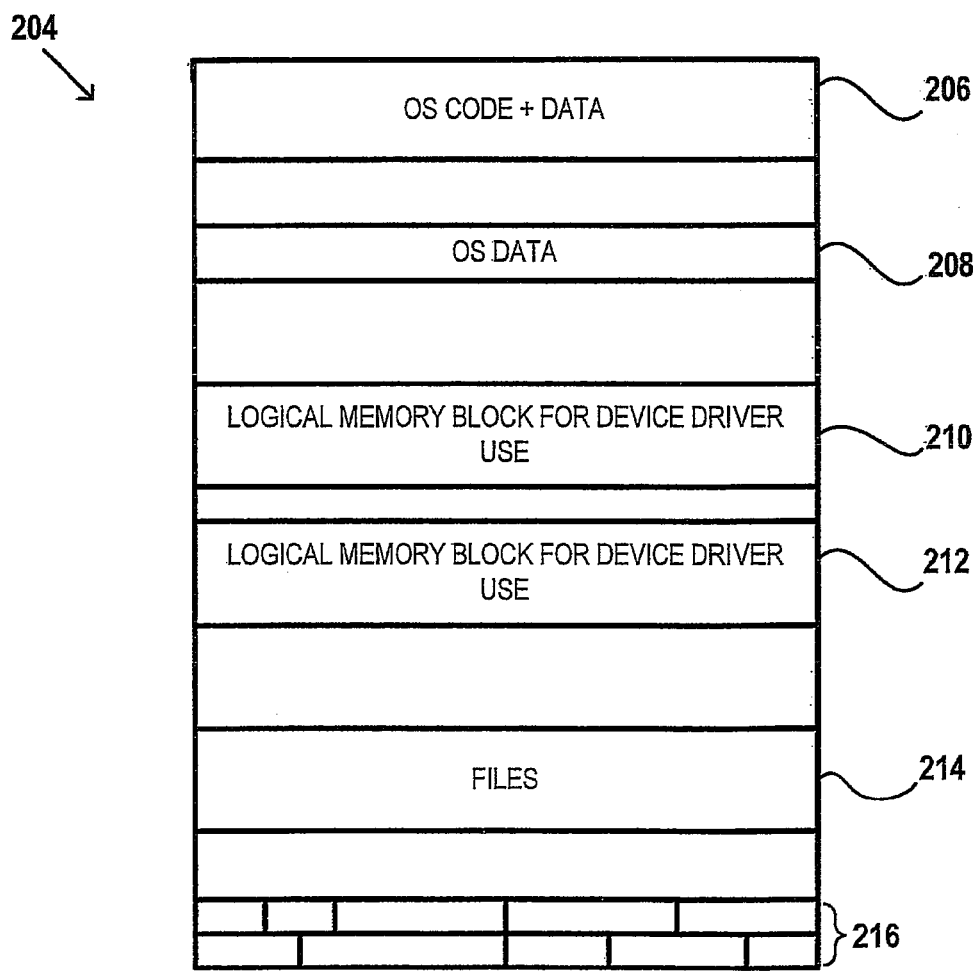
FIG. 2B is a block diagram illustrating a logical representation of an operating system stored in system memory of the exemplary data processing system of FIG. 1.

Referring now to FIG. 2B, there is illustrated a block diagram representing the logical organization of memory within occupied regions 204 according to a preferred embodiment of the present invention. As depicted, logical memory blocks 206, 208, 210, 212, 214, and 216 logical memory locations that are mapped to occupied regions 204 within physical memory 104. For example, logical memory block 206 and 208 include operating system code and data. Logical memory blocks 210 and 212 are allocated for device driver use. Logical memory blocks 214 and 216 include various application code and data, as illustrated. Those with skill in this art will appreciate that the operating system and applications running on data processing system 100 also include handlers to dynamically allocate memory within system memory 104.

Figure 3:
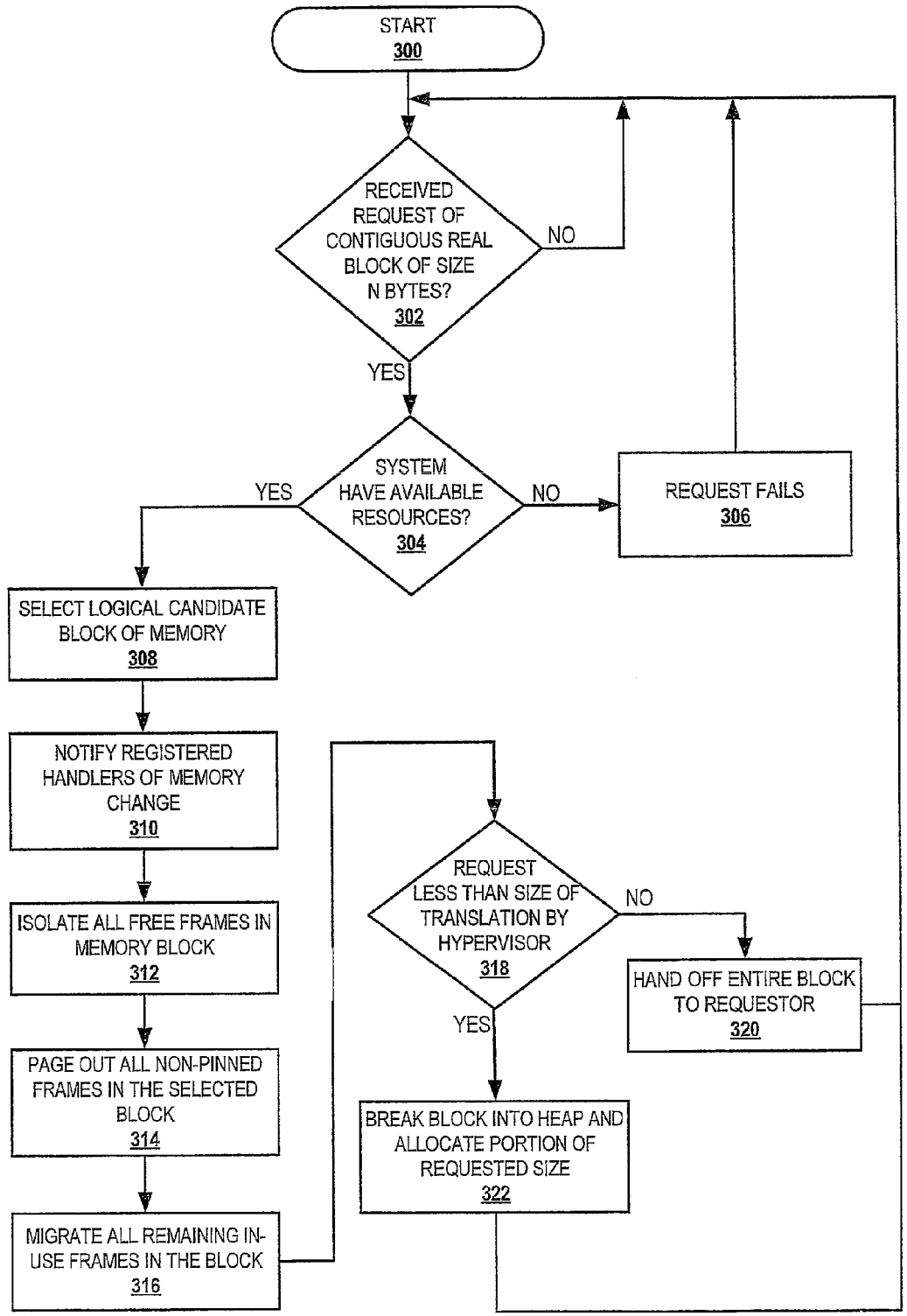
FIG. 3 is a high-level logical flowchart depicting an exemplary method of allocating contiguous memory in the data processing system of FIG. 1 according to a preferred embodiment of the present invention.

Referring now to FIG. 3, there is a high-level logical flowchart illustrating a method of allocating contiguous real memory in a data processing system according to a preferred embodiment of the present invention. The process begins at step 300 and proceeds to step 302, which illustrates memory controller 105 (through DR 103) determining whether a request for a contiguous block of memory has been received from a component of data processing system 100, such as peripherals 112. If DR 103 determines that a request has not been received, the process iterates at step 302.

If, however, DR 103 determines that a request has been received from a component within data processing system 100, the process continues to step 304. Step 304 illustrates DR 103 determining whether system memory 104 includes the available resources to fulfill the request. If DR 103 determines that system memory 104 does not have the available resources to fulfill the request, the process continues to step 306, which illustrates DR 103 failing or declining the request. The process then returns to step 302 and proceeds in an iterative fashion. However, if DR 103 determines that system memory 104 includes available resources to fulfill the request, the process continues to step 308.

Step 308 illustrates DR 103 selecting a candidate block of memory. Typically, DR 103 and previously-described hypervisor can address memory blocks within system memory 104 in a fixed minimum size, commonly referenced as a "logical memory block". Therefore, in a preferred embodiment of the present invention, the candidate memory block selected by DR 103 is at least the size of a logical memory block. The size of the logical memory block can be of any size and varies between different data processing systems. The process continues to step 310, which depicts DR 103 notifying all registered handlers of upcoming change in system memory 104. The registered handlers can be stored any where within system memory 104 and enable the operating system and/or applications to dynamically allocate system memory 104.

The process then continues to step 312, which illustrates DR 103 temporarily isolating all frames in candidate block of memory from access from components of data processing system 100. The temporary isolation of the candidate block of memory is required to prevent the components of data processing system 100 from further modifying the candidate block of memory before its allocation to the requesting component.

Those with skill in this art will appreciate that system memory 104 typically includes pinned and non-pinned frames. Pinned frames are blocks of instructions or data that are required to be stored in system memory 104 and must not be paged out of memory. For example, local access to some instructions or data of the operating system and/or firmware may be essential for data processing system 100 operation and should not be paged out to a slower, higher-capacity storage element such as hard disk drive 110. Non-pinned frames may be paged in and out of memory as determined by DR 103. The process then continues to step 314, which illustrates memory controller 105 paging all non-pinned frames in the candidate block of memory to the next level in the memory hierarchy, such as, for example, hard disk drive 110. The process proceeds to step 316, which depicts DR 103 allocating all remaining in-use frames within the candidate block of memory to other areas of system memory 104.

As previously discussed, a hypervisor resident in system memory 104 preferably manages the paging of memory by the operating system. As previously discussed, the hypervisor pages memory between system memory 104 and the next level of the memory hierarchy (such as hard disk drive 110) at a fixed page size, commonly referred as a "logical memory block". However, the request received in step 302 may be for a block of memory that is smaller than the logical memory block, as illustrated in step 318. If the requested block is smaller than the logical memory block, memory controller 105 divides the candidate memory block into a "requested portion" and a "non-requested portion" and allocated the "requested portion" to the component requesting the contiguous memory block, as illustrated in step 322. The process then returns to step 302 and proceeds in an iterative fashion. However, if the requested block is not smaller than the logical memory block, the entire logical memory block is allocated to the requesting component, as illustrated in step 320. The process then returns to step 302 and proceeds in an iterative fashion. This feature of the present invention enables data processing system 100 to allocate only the amount of memory needed for the contiguous real memory block. All remaining memory may be freed for other uses within data processing system 100. This feature addresses a limitation in the prior art where contiguous real memory blocks must be conservatively large to account for dynamically-changing contiguous real memory requirements. The present invention allows for custom-sized, dynamic contiguous real memory allocation and reduces wasted real memory space.

As disclosed, the present invention includes a method of dynamic allocation of contiguous real memory regions from general system memory without relying upon a separate, statically-reserved contiguous memory pool. Also, the present invention includes a system for allocating and freeing regions within system memory. A region allocation request is generally handled by dynamically removing contiguous real memory from the system memory pool of the running system to satisfy the request. This dynamic removal is accomplished through use of a memory manager, including a Dynamic Reconfiguration (DR) framework, which identifies, isolates, and frees the desired memory. Additionally, the memory manager (through the DR framework) can notify components of the system, including applications, of the reduction in available system memory to allow them to adjust to the reduction. A region deallocation request is generally handled by dynamically adding the previously-allocated contiguous real memory of the region back into the system memory pool of the running system. This deallocation is accomplished through the memory manager (through the DR framework), which makes the memory available for other uses, including the possible use for backing memory for virtual memory pages or serving as the memory used in satisfying a future contiguous real memory region allocation. The memory manager may also notify system components of the addition of the memory to allow them to adjust.

Utilizing this method, the maximum contiguous real memory region that can be allocated is a logical memory block (LMB). The LMB size is dependent on the hardware, firmware, and administrative settings and can be of much more significant sizes than the virtual memory page sizes. LMBs are the unit of the DR. For region allocation request smaller than LMB size, these requests are satisfied through allocation heaps maintained over LMBs. The LMBs containing allocation heaps are dynamically allocated using the memory manager (through the DR framework) when a request is made for a small region and no allocation heap in a previously allocated LMB has sufficient contiguous free space available. A LMB containing an allocation heap is dynamically freed and returned back to the system memory pool utilizing the DR when all allocation heap space for that LMB is freed.

The present invention has several advantages over other solutions. First, the present invention provides the opportunity for better resource utilization. Memory regions are allocated from the system memory pools at the time they are needed and freed when the need goes away. While system memory is not in use for contiguous real regions, it can be used for other purposes. Next, the present invention requires no system administrator intervention. There is not static pool to be administered to fit a particular system environment or adjust to changing contiguous real memory requirements. Finally, the present invention provides the advantage of greater reliability and availability. Since contiguous real regions can fully utilize the available system memory and are not confined to a static pool, region allocation requests are less likely to fail because of insufficient memory resources. Also, there is no need to reboot the system to make more or less memory available to the users of contiguous memory.

Also, it should be understood that at least some aspects of the present invention may be alternatively implemented in a program product. Programs defining functions on the present invention can be delivered to a data storage system or a computer system via a variety of signal-bearing media, which include, without limitation, non-writeable storage media (e.g., CD-ROM), writable storage media (e.g., floppy diskette, hard disk drive, read/write CD-ROM, optical media), and communication media, such as computer and telephone networks including Ethernet. A computer-readable storage medium can be a non-writeable storage medium or a writeable storage medium. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

The invention claimed is:

1. A program product for allocating contiguous real memory in a data processing system, comprising:
   instructions, stored on a computer-readable storage medium, for receiving a request from a data processing system component for a contiguous block of real memory, during operation of a data processing system, wherein said data processing system includes a memory hierarchy that includes at least a system memory and a higher latency memory storage;
   instructions, stored on a computer-readable storage medium, for selecting a candidate contiguous block of real memory, wherein said candidate contiguous block of real memory is a contiguous block of real memory of a predetermined size that may be assigned for exclusive use by said data processing system component during operation of said data processing system, in response to receiving said request;
   instructions, stored on a computer-readable storage medium, for temporarily restricting access to said candidate contiguous block of real memory, during operation of said data processing system;
   instructions, stored on a computer-readable storage medium, for identifying a plurality of frames currently in use within said candidate contiguous block of real memory, wherein said instructions for identifying further includes:
      instructions, stored on a computer-readable storage medium, for identifying at least one pinned frame among said plurality of flames, wherein said at least one pinned frame is a block of instructions or data that is required to be stored in said system memory; and
      instructions, stored on a computer-readable storage medium, for identifying at least one non-pinned frame among said plurality of frames, wherein said at least one non-pinned frame is a block of instructions or data that is not required to be stored in said system memory;
   instructions, stored on a computer-readable storage medium, for relocating said plurality of frames, during operation of said data processing system, wherein said instructions for relocating further comprises:
      instructions, stored on a computer-readable storage medium, for relocating at least one pinned frame among said plurality of frames from said candidate contiguous block of real memory to another location within said system memory; and
      instructions, stored on a computer-readable storage medium, for paging out at least one non-pinned frame among said plurality of frames to said higher latency memory storage within said memory hierarchy; and
   thereafter allocating said candidate contiguous block of real memory for exclusive use by said data processing component.

2. The program product according to claim 1, further including:
   instructions, stored on a computer-readable storage medium, for notifying at least one application utilizing memory within said candidate contiguous block of real memory of upcoming change in said system memory.

3. The program product according to claim 1, further including:
   instructions, stored on a computer-readable storage medium, for determining whether a size of said request is less than a size of said candidate block of real memory;
   instructions, stored on a computer-readable storage medium, in response to determining said size of said request is less than said size of said candidate block of real memory, for allocating a portion of said candidate block of real memory corresponding to said size of said request; and
   instructions, stored on a computer-readable storage medium, in response to determining said size of said request is not less than said size of said candidate block of real memory, for allocating all of said candidate block of real memory to said data processing system component.

* * * * *